US008315732B2

(12) United States Patent
Fijnvandraat

(10) Patent No.: US 8,315,732 B2
(45) Date of Patent: Nov. 20, 2012

(54) METHOD OF PREPARING MAIL PIECES INCLUDING REPLY ITEMS

(75) Inventor: Hendrik Cornelis Fijnvandraat, Enschede (NL)

(73) Assignee: Neopost Industrie, Bagneux (FR)

( * ) Notice: Subject to any disclaimer, the term of this patent is extended or adjusted under 35 U.S.C. 154(b) by 463 days.

(21) Appl. No.: 12/705,166

(22) Filed: Feb. 12, 2010

(65) Prior Publication Data

US 2010/0211212 A1 Aug. 19, 2010

(30) Foreign Application Priority Data

Feb. 12, 2009 (EP) .................................... 09152696

(51) Int. Cl.
*G06F 7/00* (2006.01)
*G06F 17/00* (2006.01)

(52) U.S. Cl. ........ 700/223; 700/221; 700/224; 700/226; 700/222; 705/404

(58) Field of Classification Search ........................ None
See application file for complete search history.

(56) References Cited

U.S. PATENT DOCUMENTS 4,796,196 A * 1/1989 Durst et al. ................... 700/224
4,800,504 A * 1/1989 Durst et al. ................... 700/221
4,800,505 A * 1/1989 Axelrod et al. ............... 700/221
6,385,504 B1 5/2002 Pintsov et al.
2003/0055791 A1 3/2003 Bodie et al.
2006/0053084 A1 3/2006 Haas et al.
2006/0053085 A1 3/2006 Guyett et al.
2006/0173798 A1 8/2006 Charroppin
2006/0271236 A1 11/2006 Rosen et al.

FOREIGN PATENT DOCUMENTS

WO 2008/047117 A2 4/2008

* cited by examiner

*Primary Examiner* — Gene Crawford
*Assistant Examiner* — Yolanda Jones
(74) *Attorney, Agent, or Firm* — Sughrue Mion, PLLC

(57) ABSTRACT

For preparing mail pieces including reply items to be returned by addressees of the mail pieces, address carriers (20) are fed one by one from a first feeding station (2). An address (21) is scanned from each fed address carrier (20). Address data sets each representing a scanned address (21) are stored. A unique identification code (23) is scanned from each fed reply item (22) and stored as a reply code data set representing the scanned identification codes (23). Mail pieces of which at least a plurality each comprises at least one of the fed address carriers (20) and at least one of the fed reply items (22) are prepared. For each assembled mail piece comprising at least one of the address carriers (20) and at least one of the reply items (22), an association between the reply code data set and the address data set of that mail piece is stored.

6 Claims, 3 Drawing Sheets

METHOD OF PREPARING MAIL PIECES INCLUDING REPLY ITEMS

FIELD AND BACKGROUND OF THE INVENTION

The invention relates to a method for preparing mail pieces including a reply item. In many mailings responses from addressees are solicited, for example when conducting a survey into customer satisfaction or behaviour, in fund raising, when processing discount coupons or as part of a ballot procedure. In order to facilitate replying, mail pieces of such mailings include reply items, such as reply forms, reply cards or reply envelopes. These reply items are commonly provided with a code, such as a barcode, to be able to determine who has responded when the reply item is received or to determine whether the person responding is entitled to the discount offered.

In United States patent application publication 2006/053084, a system and method for identification of codes for tracking outbound mail and corresponding inbound reply mail is disclosed. Ballot packages consisting of a ballot, instructions and a reply envelope are gathered. The back of the ballot, which should not be retraceable to a voter, carries a ballot style code. After each of the ballot packages has been inserted into an envelope, a style code is visible through a first back window of an envelope and an inbound tracking code for giving an authority advance notice when which quantities of incoming return ballots ate to be expected. Prior to reaching the auto ballot mailer machine 41, the stuffed ballot packages do not include any indication of an intended recipient. On the basis of the style code and data listing which voters are supposed to receive which ballot types, a controller computer selects a next voter and instructs the printer to print the voter's name, address, voter ID code and other tracking information onto the back of the reply envelope, through an open window in the carrier envelope. An audit camera captures data printed on the ballot package and sends the data to a computer, which validates that the decoded data include the voter the data expected for the package.

A drawback of this method is that special measures are required to allow printing on the inserted reply envelope through an open window of the carrier envelope and to ensure that the address on the reply envelope is visible through a window of the carrier envelope. Furthermore, it is required that a list of addressees is provided and accessed during preparation of the mail pieces for reading from and writing to voter's files and that the gathered mail pieces are controlled to ensure that the printed addresses match the associated unique tracking identification markings.

From United States patent application publication 2006/0271236, a system is known for tracking and reporting of mail pieces wherein a document management system is used for printing a unique information code on a document that is to be inserted in an envelope, wherein the code is linked to address information of the mail piece. This code is then used by an in-process tracking and archiving system to track the document during processing and to verify that the document is inserted. Additionally the code may be printed on the envelope in which the document is to be inserted, to allow tracking through a mail system of e.g. USPS (United States Postal Service) or BPO (British Post Office). When the document, or a part thereof, is received from the addressee, the unique code enables automatic processing as the code is linked to the stored address information of the former recipient.

A drawback of such a system is that in order to enable tracking through a mail system of e.g. BPO or USPS, the code has to comply with an external standard such as Four State Code (BPO) or Planet Code (USPS), and consequently the code has to be derived from the address information. Another drawback is that, when the code is printed on both the document and the envelope in which the document is to be inserted, the need of matching the document and the corresponding envelope complicates processing.

SUMMARY OF THE INVENTION

It is an object of the present invention to provide a reliable and simple solution for linking reply items to the respective addressees to whom the reply items are sent.

According to the invention, this object is achieved by providing a method for preparing mail pieces including reply items to be returned by addressees of the mail pieces, including: providing a plurality of address carriers, providing a plurality of reply items, each carrying a unique identification code, feeding the address carriers one by one from a first feeding station, scanning an address from each fed address carrier, storing address data sets each representing a scanned address, feeding the reply items one by one from a second feeding station, scanning the unique identification code from each fed reply item, storing reply code data sets each representing one of the scanned identification codes, and assembling mail pieces. At least a plurality of the mail pieces each include at least one of the fed address carriers and at least one of the fed reply items. For each assembled mail piece including at least one of the address carriers and at least one of the reply items, an association between the reply code data set and the address data set of that mail piece is stored.

By establishing an association between unique identification codes and address data by scanning the address data from the address carrier with which the reply item carrying the unique identification code has been combined in the course of preparing a mail piece, the data allowing to identify from which addressees the reply items have been received are obtained in a very simple and reliable manner.

Particular elaborations and embodiments of the invention are set forth in the dependent claims.

Further features, effects and details of the invention appear from the detailed description and the drawings.

DETAILED DESCRIPTION

Figure 1:
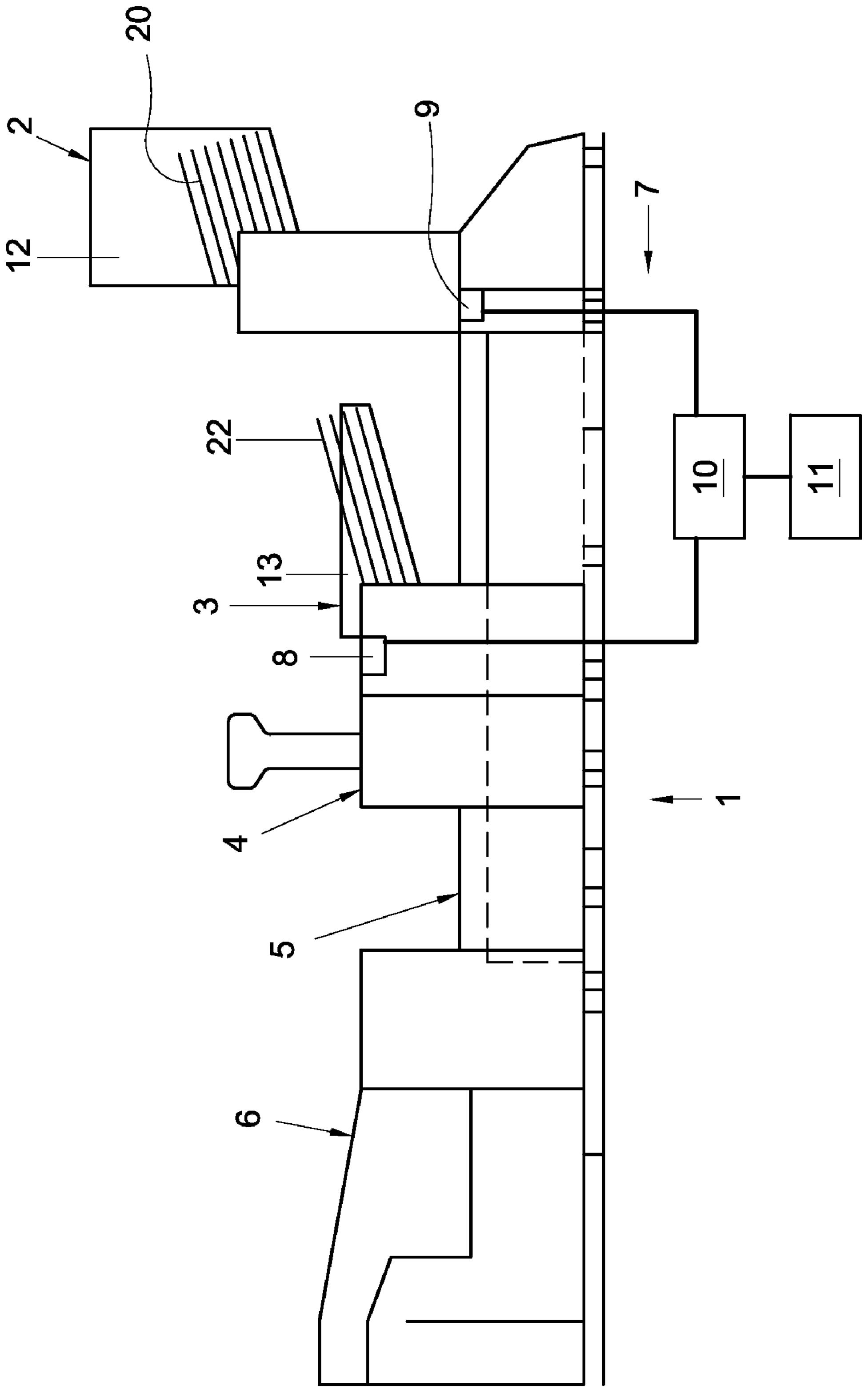
FIG. 1 is a schematic side-view of an example of a system for preparing mail pieces.

In FIG. 1, a system for preparing mail items is shown. The system 1 has a number of successive processing stations 2-4 and 6 and a transport module for transporting items from a document feeding station 2 to insert feeding station 3, from insert feeding station 3 to folding station 4 and from folding station 4 to inserting station 5. The processing stations 2-4 and 6 are arranged in a general processing direction 7 of the mail items. The document feeding station 2 has a support 12 for receiving a stack of documents 20 and is arranged for feeding the documents one by one from the stack. The insert feeding station 3 has a support 13 for receiving a stack of inserts 22 and is arranged for feeding the inserts one by one from the stack. The system further has two scanners 8 and 9 for scanning indicia from items to be fed. Furthermore, the scanners 8, 9 are connected to a control unit 10 communicating with a memory 11.

Figure 3:
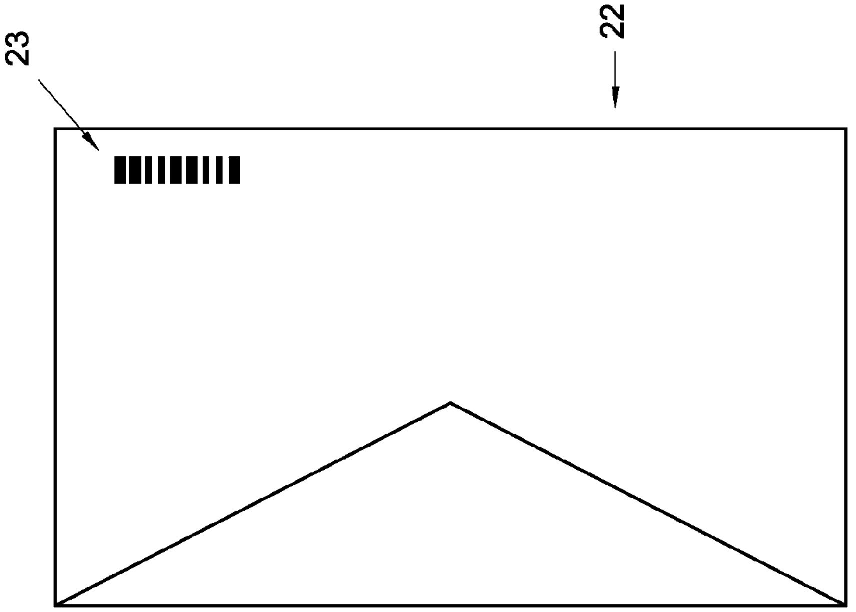
FIG. 3 is a frontal view of an example of a Business Reply Envelope carrying an identification code.
Figure 2:
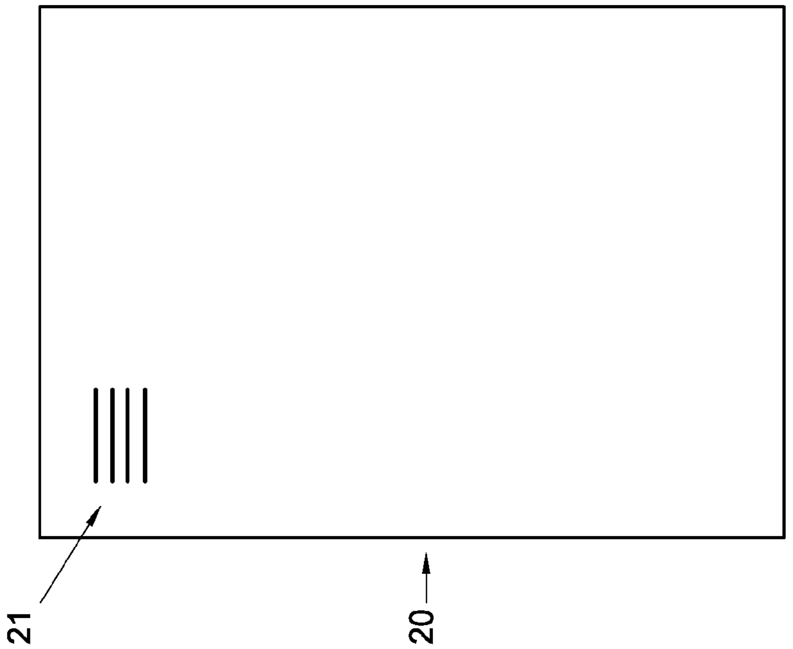
FIG. 2 is a frontal view of an example of an address carrier carrying an address.

In an example of a method according to the invention, the system 1 operates as follows. At the start of preparing a series of mail pieces, the first feeding station 2 contains a stack of address carriers 20, in this example a stack of forms each carrying an address 21 thereon (see FIG. 2). The forms 20 are intended to be filled out by an addressee and returned in a Business Reply Envelope (BRE) 22 (see FIG. 3) by mail. The inserts stacked onto the support 13 of the insert feeding station are such BREs 22. The envelopes 22 each carry a unique identification code 23, which has been applied to the envelope prior to loading the BREs 22 into the insert feeding station 3, preferably by printing. This code may be a barcode, a series of sequential numbers or characters or any other indicia that can be scanned, data represented by the indicia being automatically determinable from the signal obtained during scanning.

Figure 4:
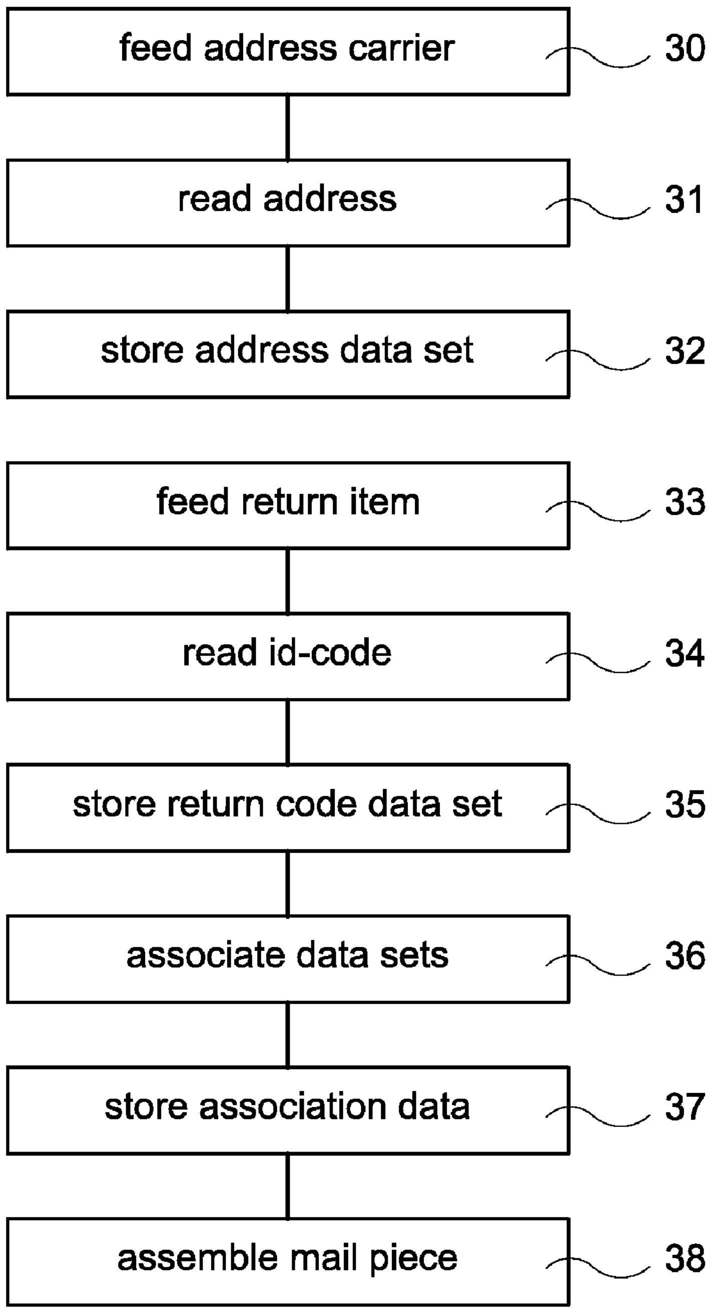
FIG. 4 is a flow chart of an example of a method according to the invention.

After the forms 20 and BREs 22 have been placed on the supports 12, 13, the preparation of mail pieces continues with step 30 (FIG. 4) in which a form 20 is fed one by one from the first feeding station 2 and transported by the transport unit 5 towards the insert feeding station 3. As the form 20 passes the scanner 9, the address 21 is scanned and address data are determined from the signal obtained during scanning (step 31) by the control processor 10. The address data may contain the name of an addressee and more than one addressee may be located at the same address. Depending on the requirements of the mailing, the addressee may also be constituted by the address as such, for instance if it is only desired to receive a response from a household or any other entity residing at the address.

Subsequently, the address data are stored (step 32) as a set of address data in the memory 11. In step 33, one of the BREs 22 is fed from the insert feeding station 3 to be collated with the form 20 which has arrived from the document feeding station 2. As the BRE 22 is fed, it passes by the scanner 8, which scans the indicia 23 representing a unique identification code from the BRE 22 and outputs a scanning signal to the control processor 10 where the unique identification code is determined from the scanning signal received from the scanner 8 (step 34). The unique identification code is stored as a reply code data set in the memory 11 (step 35). Furthermore, the control processor generates a reference from the unique identification code to the address data set which was stored in step 32 (step 36). The association data representing the association between the address data set and the reply code data set which have been established thereby are stored in the memory 11 (step 37).

The BRE 22 is collated with the form 20 (step 38) and the collated set of items 20, 22 is transported by the transport unit 5 to the folding station 4 where the form 20 is folded. The BRE may also be folded, but is preferably of a size which allows the BRE to be inserted without folding. To this effect, the BRE is positioned relative to the form 20, such that it is located against one of the panels that is formed after folding and does not project outside that one of the panels. The folded form 20 and the BRE 22 are subsequently transported towards the inserting station 6 and inserted into an envelope (step 38), thus creating an assembled mail piece. The envelope is a window envelope and the positions of the address 21, the folds and the window of the carrier envelope are such that the address 21 is visible through the window.

If is also possible to insert each reply item or each set of reply items and any other postal item or items, which are to be sent with the reply items into envelopes on which the address of the addressee has been applied prior to insertion of the items, for instance by printing or applying address stickers. If the envelopes into which the contents is to be inserted constitute the address carriers, the addresses are to be scanned from each of the envelopes just before or while that envelopes is fed to an inserting position in the inserter, where the associated contents, including a reply item carrying indicia representing a unique code associated to the address on the envelope, is inserted into the envelope.

This sequence of steps is repeated for each form 20 of the stack or from a series of stacks, until the job of inserting all forms 20 into a carrier envelope with an associated BRE 22 has been completed and data associating each unique identification code with an address or an addressee has been established.

The stored data can be retrieved or outputted from the memory 11, for instance to an external computer system (not shown) connected to the memory, to make the association data available for use during processing of incoming return mail. While the term return mail is used, it is not necessary that the return mail is actually transported back to the physical location from where the mail has originally been sent. The mail may have been sent from a service centre for producing mail and be returned to a customer of the service centre or be returned to yet another service centre specialized in processing incoming mail.

During the processing of incoming return mail, the BREs in which filled-out forms are received are passed along a scanner and the unique identification codes are determined from the scanning signals that are generated as the indicia on the envelopes are scanned. Using the association data obtained from the memory 11, it can then easily be determined for each received BRE which set of address data is associated thereto. This information may subsequently be used for various purposes, such as determining from which addresses return mail has been received, allocation of the processing of returned mail or sorting of the incoming mail.

By associating the address data sets and the return code data sets both obtained by scanning in the mail preparation system in which the mail pieces are assembled, there is no need for coordinated printing of addresses and/or identification codes during the preparation of the mail pieces or for controlling the processing of printed items such that matching items are combined into mail pieces. Also the need of reading data from a database during preparation of the mail sets, which requires the data to be formatted in a form processable by the control unit of the mail processing apparatus, is avoided. Only after the items have been scanned, it has to be ensured that addresses and indicia representing identification codes are combined in accordance with the established association data that are stored.

Scanning the indicia from the returned reply items can be carried out without requiring any additional special equipment by loading the returned reply items into the mail preparation system with which the mail pieces have been prepared. The reply items are then fed individually and transported along one of the scanners of the system where the indicia representing the unique identification codes are scanned from the returned reply items. Preferably, the turned reply items are fed along the same scanner that has previously scanned the indicia representing the unique identification codes as the reply items were fed to be combined with other items into mail pieces.

In some applications, such as the processing of ballot papers or for ensuring the privacy of respondents, it is preferred or required that the documents received in the BREs cannot be associated to the respective addressees from whom the return mail has been received. To this end, the documents to be returned do not carry any indication of the addressee from which the document has been received back and the envelope from which the unique identification code has been read to determine from which addressee a response has been received back is separated from the contents of the envelope. Thus, information with regard to which addressees have responded can be obtained independently from the information received from the addressees. Furthermore, as the association data are available only to the party that has sent the mail, information supplied on the forms, whether confidential or not, cannot be linked to an addressee when the BRE is in transit. Thus, someone opening the BRE unauthorized only acquires anonymous, isolated information.

While the invention has been illustrated and described in detail in the drawings and foregoing description, such illustration and description are to be considered illustrative or exemplary and not restrictive; the invention is not limited to the disclosed embodiments. For example, when mail pieces are to contain several reply items carrying identification codes, the respective identification codes can be associated with the same corresponding addressee data set. Depending on the type of mailing, also reply cards, or other forms may be processed as reply items.

Other variations to the disclosed embodiments can be understood and effected by those skilled in the art in practicing the claimed invention, from a study of the drawings, the disclosure, and the appended claims.

The invention claimed is:

1. A method for preparing mail pieces including reply items to be returned by addressees of the mail pieces, comprising:

providing a plurality of address carriers;

providing a plurality of reply items, each carrying a unique identification code;

feeding the address carriers one by one from a first feeding station;

scanning an address from each fed address carrier;

storing address data sets each representing a scanned address;

feeding the reply items one by one from a second feeding station;

scanning the unique identification code from each fed reply item;

storing reply code data sets each representing one of the scanned identification codes; and assembling mail pieces, wherein at least a plurality of the mail pieces each comprises at least one of the fed address carriers and at least one of the fed reply items;

wherein, for each assembled mail piece comprising at least one of the address carriers and at least one of the reply items, an association between the reply code data set and the address data set of that mail piece is stored.

2. A method according to claim 1, further comprising:

sending the mail pieces to recipients;

receiving at least some of the reply items back;

loading the returned reply items into a mail preparation system of the same type as the mail preparation system with which the mail pieces have been prepared, and individually feeding and transporting the returned reply items along a scanner of the system where the indicia representing the unique identification codes are scanned from the returned reply items.

3. A method according to claim 2, wherein the mail preparation system into which the turned reply items are loaded is the mail preparation system in which the mail pieces containing the returned reply items have been prepared.

4. A method according to claim 3, wherein the scanner along which the returned reply items are transported is the scanner along which the reply items have been transported for scanning the indicia representing the unique identification codes as the reply items were fed to be combined with other items into the mail pieces.

5. A method according to claim 1, wherein the address carriers are envelopes, wherein each reply item or set of reply items is inserted into one of the address carriers.

6. A method for preparing mail pieces including reply items to be returned by addressees of the mail pieces, comprising:

providing a plurality of address carriers, each carrying indicia representing an address;

providing a plurality of reply items, each carrying indicia representing a unique identification code;

feeding the address carriers one by one from a first feeding station;

scanning indicia representing an address from each fed address carrier;

determining address data from a signal obtained during scanning;

storing the address data as address data sets each representing a scanned address;

feeding the reply items one by one from a second feeding station;

scanning the indicia representing a unique identification code from each fed reply item;

determining a unique identification code from a scanning signal received from the scanner;

storing the unique identification code as reply code data sets each representing one of the scanned identification codes; and assembling mail pieces, wherein at least a plurality of the mail pieces each comprises at least one of the fed address carriers and at least one of the fed reply items;

wherein, for each assembled mail piece comprising at least one of the address carriers and at least one of the reply items, an association between the reply code data set and the address data set of that mail piece is stored.

* * * * *